United States Patent [19]
Sausaman

[11] 3,839,123
[45] Oct. 1, 1974

[54] ELASTOMERIC HEAT AND PRESSURE ANNULUS

[75] Inventor: Robert E. Sausaman, Akron, Ohio

[73] Assignee: The General Tire & Rubber Company, Akron, Ohio

[22] Filed: Sept. 1, 1972

[21] Appl. No.: 285,703

[52] U.S. Cl. ............... 156/394, 156/96, 156/129, 156/394 FM, 249/65, 264/36, 264/315, 425/39
[51] Int. Cl. ............................................. B29h 5/16
[58] Field of Search .............................. 156/94–96, 156/105, 394, 123, 127, 128, 416; 264/315, 316, 36, 326; 425/17, 39, 40, 43, 334, 389; 249/65

[56] References Cited
UNITED STATES PATENTS

| | | | |
|---|---|---|---|
| 1,483,857 | 2/1924 | Fitzharris | 156/394 FM |
| 2,468,121 | 4/1949 | Shell | 156/394 FM |
| 2,766,006 | 10/1956 | Kraft | 156/394 FM |
| 3,018,213 | 1/1962 | Kraft | 156/416 |
| 3,101,289 | 8/1963 | Giletta | 156/416 |
| 3,698,975 | 10/1972 | Hogan | 156/129 |
| 3,729,358 | 4/1973 | Barefoot | 156/128 |
| 3,745,084 | 7/1973 | Schelkmann | 156/394 FM |

FOREIGN PATENTS OR APPLICATIONS 555,689  9/1943  Great Britain ............... 156/394 FM

*Primary Examiner*—Clifton B. Cosby
*Assistant Examiner*—John E. Kittle
*Attorney, Agent, or Firm*—Harry F. Pepper, Jr.

[57] ABSTRACT

An elastomeric annulus is specially constructed for use in retreading pneumatic tires where a pre-cured or pre-vulcanized tread section is applied to a buffed or otherwise properly prepared tire carcass or casing. The annulus is structurally adapted to tightly engage and enclose the peripheral portion of the tire with the pre-cured tread section in place and internally receive a pressurized fluid heating medium so that the tread section is cured to the tire carcass or casing.

2 Claims, 4 Drawing Figures

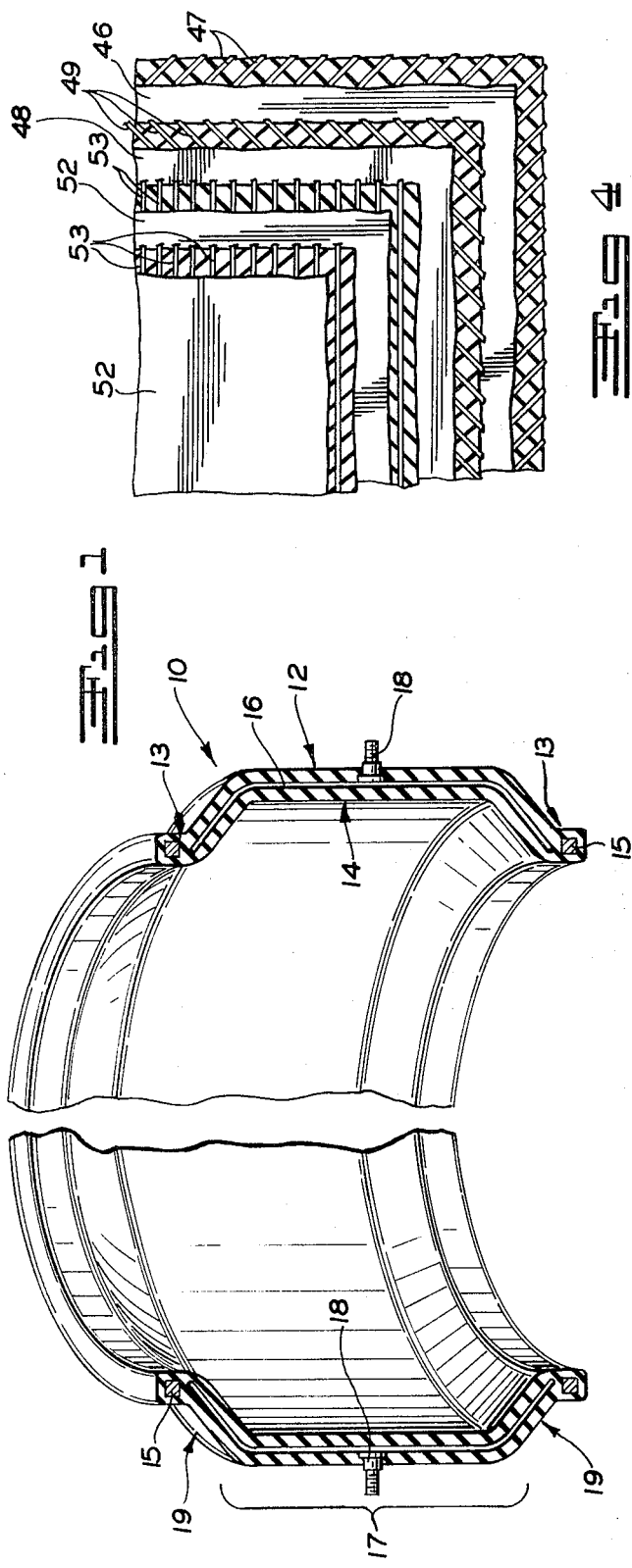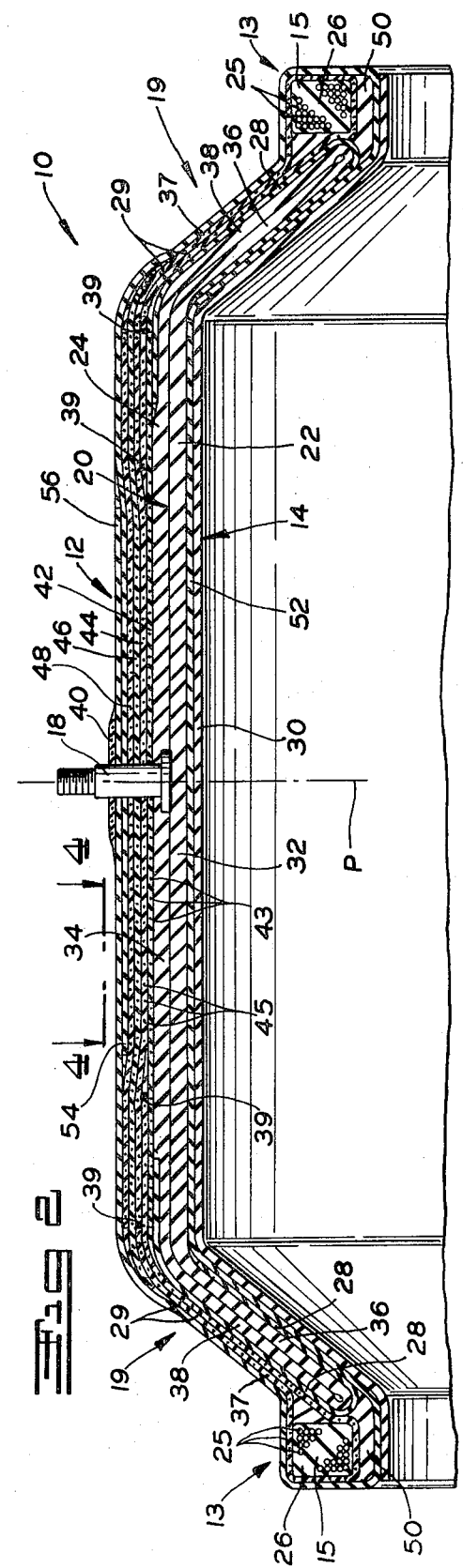

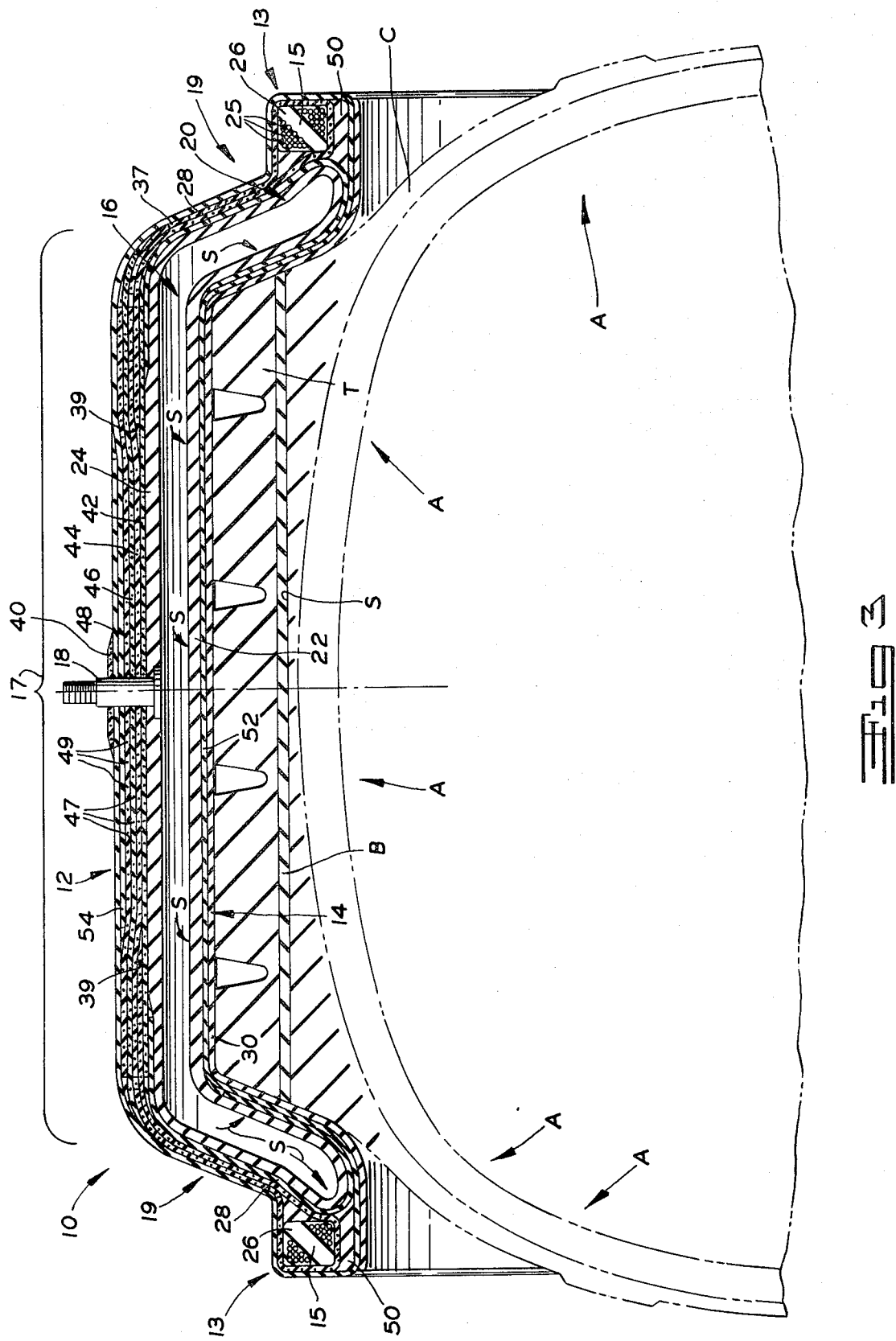

ELASTOMERIC HEAT AND PRESSURE ANNULUS

BACKGROUND

The invention relates to tire retreading or recapping operating and more particularly, to a device used in such operations.

Most retreading operations in use today can be generally categorized as either "hot" or "cold" retreading operations. In hot retreading the material which is to comprise the new tread or "recap" is applied to a properly prepared used and previously vulcanized tire carcass or casing in an uncured or unvulcanized state. The resulting assembly, i.e. the casing and applied uncured tread material is then vulcanized at high temperatures in a suitable mold. Cold retreading, on the other hand, comprises applying a prevulcanized or precured tread strip to the used tire casing or carcass and thereafter securely bonding the tread to the casing by means of a layer of vulcanized bonding material situated between the prevulcanized tread strip and the casing.

Proponents of the cold retreading processes allege reception advantages over hot retreading. Adequate descriptions of several types of cold retreading processes and many of the principal advantages attendant thereto are described in varying degrees in U.S. Pat. Nos. 2,966,936; 2,976,910; 3,136,673; 3,207,647; 3,236,709; 3,283,795; 3,325,326; 3,455,753; and 3,559,711.

One of the primary and allegedly advantageous differences between cold and hot retreading operations is that the assembly comprising the used pneumatic tire casing and the applied prevulcanized tread strip in cold retreading power is not subjected to the relatively high temperatures presently necessary in hot retreading. The layer of bonding material between the prevulcanized tread strip and the tire casing is a composition specially adapted to vulcanize at relatively low temperatures. The exact composition of these layers used presently is largely a matter of choice and varies as can be seen from the disclosures of several of the United States patents mentioned above. Many of these binding layer compositions in use today are formulated so as to cure at temperatures between about 140°F. and about 220°F. and thus join the precured tread to the carcass. There are however, special applications wherein this binding layer may be formulated to cure at temperatures either below or above the range. Comparably, temperatures necessary for hot retreading processes normally are in excess of 300°F.

Cold retreading operations in use today typically include a means for tightly engaging and enclosing the casing, binding layer and applied precured tread assembly while the same is heated. A presently popular version of this means is a flexible cover or envelope which is tightly wrapped around at least the entire outer surface of the assembly prior to placing the assembly in a suitable autoclave or pressure chamber. The inner and outer surface of the entire assembly is then pressurized in a suitable manner and the chamber is warmed to the preselected temperature which will effect vulcanization of the binding layer, and thus bind or secure the precured tread to the used pneumatic tire casing.

SUMMARY

It is an object of the present invention to provide an improved means used to engage the assembly of a used pneumatic tire carcass and a precured tread assembled according to cold retreading operations.

It is another object of the present invention to provide a means for engaging the assembly of a used tire carcass and a precured tread which additionally functions to apply the heat necessary to vulcanize the binding layer between the precured tread and the carcass.

It is still another object of the present invention to provide a means which both engages and heats an assembly made in accordance with a cold retreading process thus obviating the need for heating and/or pressure autoclaves or chambers. a control voltage These and other objects which will become evident in the following description are achieved by a specially constructed elastomeric heat and pressure annulus contoured to engage the peripheral portion of a retreaded tire assembly, which annulus is adapted to be internally supplied with a heating fluid such as, for example, steam. The annulus is shaped so as to tightly enclose and engage the precured tread section and a portion of the upper sidewalls of the used tire casing and is provided with rigid inextensible circular members at the axial ends thereof, to maintain such engagement with the tire while the precured tread is being joined to the casing by vulcanization of the binding layer therebetween.

BRIEF DESCRIPTION OF THE DRAWINGS

FIG. 1 is a perspective view showing the general details of a heat and pressure annulus according to a presently preferred embodiment of the present invention, signal. with portions being omitted and/or shown in section.

FIG. 2 is an axial cross-section of a portion of the annulus according to a presently preferred embodiment of the invention showing in more detail the construction of the annulus. In R. B.

In FIG. 3 is an axial cross-section of a portion of a heat and pressure annulus according to a presently preferred embodiment of the invention depicting more clearly its relationship and use with regard to a retreaded tire assembly.

FIG. 4 is a view taken along lines 4—4 of FIG. 2 with portions thereof broken away and/or omitted.

DETAILED DESCRIPTION OF A PRESENTLY PREFERRED EMBODIMENT

In FIGS. 1 through 4 the present capacitor is shown in accordance with a presently preferred embodiment wherein like numerals refer to like parts throughout the several views. adder In FIG. emitter a portion of a heat and pressure annulus 10 according to the present invention is seen as generally comprising a radially outer wall member 12 and a radially inner wall member 14 which are joined at each of the axial ends 13 of the annulus to enclose and define an annular fluid chamber 16 therebetween. A pair of preferably oppositely disposed valve members 18 extend through the radially outer wall member 12 to operatively communicate with the fluid chamber 16. One of the valve members 18 functions as a heating fluid inlet to chamber 16 while the other valve member functions as a heating fluid outlet from chamber 16. Which valve member is an inlet and which is an outlet is immaterial for purposes of this invention and is a matter of choice. Circular, concentric and mutually parallel members 15 incorporated within the axial end portions 13 of the annulus 10 are rigid or stiff, inextensible bead-like members which will be further described hereinafter. (a.f.c.).

As seen in FIG. 1, and as will be described ideally hereinafter, the outer and inner wall members 12 and 14 are similarly shaped and are substantially mutually parallel throughout their axial lengths. Preferably, the wall members 12 and 14 are shaped so that annulus 10 has a generally cylindrically contoured central portion 17 and a pair of substantially frusto-conically contoured marginal the 19 extending inwardly from central portion 17.

The radial inner and outer wall members 14 and 16 of annulus 10 are distinctively structured as will be more evident from FIGS. 2, 3 and 4, where the preferred structural details of annulus 10 and radial wall members 12 and 14 thereof are shown.

A principal component of the heat and pressure annulus 10 is an annular, fluid impermeable, tubular bladder member 20 having substantially mutually parallel radially inner and outer walls 22 and 24, integrally joined adjacent each axial end 13 of the annulus 10. The radial inner wall 22 and radial outer wall 24 each have substantially similar contours comprising cylindrical central portions 32 and 34 and axially spaced pairs of substantially frusto-conical marginal portions 36 and 38 respectively. The inner surfaces of these contoured walls 22 and 24 define the fluid chamber 16 (see particularly FIG. 3) mentioned previously. Thus, radial inner wall 22 of bladder 20 forms the radially outermost portion of the radial inner wall member 14 of the annulus 10 shown generally in FIG. 1, while radial outer wall 24 of bladder 20 forms the radially innermost portion of the radial outer wall member 12 of annulus 10.

In a preferred form, outer wall member 12 further includes four annular superimposed layers 42, 44, 46 and 48 of cord reinforced rubber which radially restrain radial outer wall 24 of bladder 20 and otherwise reinforce the outer wall member 12 of which they are a part. These layers coextend axially with the cylindrically contoured central portion 34 of wall 24 and terminate at selective annular locations adjacent the larger diameter ends of each frusto-conical marginal portion 38 of wall 24. The axial lengths of layers 42, 44, 46 and 48 may be substantially equal or, if desired, may individually vary to provide a staggered or stepped-off relationship as is frequently used in the arrangement of belts or breakers in the crown area of pneumatic tire constructions. the The cord reinforcement in each of layers 42, 44, 46 and 48 comprises a plurality of spaced mutually parallel cords extending at an acute angle relative to a plane P which includes the circumferential center line of annulus 10. This plane P is often called the mid-circumferential plane of annulus 10. Generally speaking, the smaller this acute angle the more radial restraint provided radial outer wall 24 of bladder 20. However because some radial outward movement of outer wall member 12 is desirable this angle should not be too small. For example, cord angles of around 30° are found suitable for purposes of this invention.

It is preferred that the cords in layers 42, 44, 46 and 48 extend at substantially equal angles relative to mid-circumferential plane P and further, that the cords in each layer extend in an opposite direction with respect to the cord direction in a layer or layers immediately adjacent thereto. Thus, in FIG. 4, layers 46 and 48 are shown with cords 47 in layer 46 and cords 49 in layer 48 extending at equal but opposite acute angles relative to mid-circumferential plane P. for It should be understood that cords 43 and 45 in layers 42 and 44, respectively, are disposed and extend similarly to that shown in FIG. 4 with respect to cords 47 and 49 in layers 46 and 48 respectively. Specifically, cords 43 would be similar in angle and direction to cords 47, while cords 45 would be similar in angle and direction to cords 49.

The radial inner wall member 14 of annulus 10 is reinforced by an annular layer 52 of cord reinforced rubber with the cord reinforcement being a plurality of substantially mutually parallel cords extending substantially normal, or at substantially a 90° angle, to the mid-circumferential plane P. The annular layer 52 is disposed radially inwardly of radial inner wall 22 of bladder 20 and coextends axially therewith. In a preferred form and as shown in FIGS. 2 through 4, layer 52 extends around each of the axial ends 13 of annulus 10 and across and over the four annular layers of cord reinforced rubber 42, 44, 46 and 48. The two ends of the layer 52 overlap as shown such that one end 54 is disposed to the left of mid-circumferential plane P while the other end 56 is to the right of mid-circumferential plane P as seen in FIGS. 2 through 4. As stated previously, and as shown more clearly in FIG. 4, the layer 52 includes a plurality of spaced mutually parallel cords 53 extending in a direction substantially normal to plane P. Cords disposed in such a direction effect a desirable reinforcement to inner wall member 14 of annulus 10 but do not inhibit the radial inward movement thereof to the extent that cords disposed at acute angles would. This feature is necessary to enhance the gripping and enclosing action desired for inner wall member 14.

It is not absolutely essential for purposes of this invention that cord reinforced rubber ply 52 extend around ends 13 and overlap in outer wall member 12 as shown and described above. Functions of layer 52 are to reinforce inner wall 22 of bladder 20, provide inner wall member 14 of bladder 20, of which it is a part, with a desired grasping or gripping action when the annulus is in operative engagement with a tire assembly to be retreaded and to structurally integrate or "tie-in" each of the rigid bead-like members 15 within axial ends 13 with the overall structure of annulus 10. Designing the layer 52 to overlap as shown is a preferred way to achieve this tie-in function.

Another important structural feature of the annulus 10 is the aforementioned spaced pair of circular, rigid bead-like members 15. The bead-like members are essential for purposes of this invention so that the annulus 10 will remain fixidly held to the peripheral portion of the tire assembly during use and will not roll or slip off the assembly. Bead-like member 15 can be constructed similar to bead cores in pneumatic tires which rigidly secure and hold such tires to their respective rims. As shown in FIGS. 2 and 3, the bead-like members 15 may comprise many turns of hard drawn steel wire 25 embedded in a hard elastomeric matrix 26. The wires 25 are usually treated or coated to achieve a bond to matrix 26. It is, of course, understood that other constructions for bead-like members are possible, if desired, so long as the bead-like members render the axial ends 13, in which they are incorporated, relatively rigid, stiff and substantially radially inextensible. Additional elastomeric filler material such as 50 may be provided around each bead-like member 15 in a manner similar to filler material provided in pneumatic tire bead areas.

These last mentioned structural components of annulus 10 (i.e. the acute angle or "bias" cord-rubber layers 42, 44, 46 and 48; the 90° angle or "radial" cord-rubber layer 52; and the circular, rigid bead-like members) are the principal features which permit the annulus 10 to be used in cold retreading operations in accordance with this invention. It is of course understood that the number of bias and/or radial cord-rubber layers can vary from that specifically shown. It is preferred, however, that the number of bias layers be even for structural balance.

A further structural feature in the presently preferred embodiment shown in FIGS. 2 and 3 includes a pair of annular bladder plies 28 which are folded around and cover the frusto-conical marginal portions of bladder 20. These bladder plies 28 protect bladder 20 from possible abrasion due to contact with bead-like members 15. Also, because the entire annulus 10 is preferably molded and vulcanized as a unitary structure, these layers serve to isolate the lateral margins of bladder 20 from areas immediately adjacent bead-like members 15 during such molding and vulcanization. The plies 28 are preferably cord reinforced rubber and more preferably, but not necessarily, the cord reinforcement comprises spaced mutually parallel cords extending in a direction normal to mid-circumferential plane P which is similar to the direction of extension of cords in layer 52.

Incorporated within annulus 10 is another pair of cord reinforced rubber plies 37 one wrapped around each bead-like member 15 and extending upwardly along the frustoconical portions 38 of wall 24 of bladder 20 and terminating along the cylindrical portion 34 of outer wall 24. The two ends 39 of each ply 37 preferably are disposed between the margins of two adjacent cord reinforced rubber such as layers 42 and 44. These plies 37 function and may be structurally similar to "flippers" used in pneumatic tires and are preferably reinforced with cords such as 29. The plies or flippers 37 tie-in the group of reinforcing layers 42, 44, 46 and 48 with each of the bead-like members 15.

Preferably, an annular elastomeric protective sleeve or layer 30 forms the innermost surface of inner wall member 14 and is disposed immediately adjacent and coextensive with that portion of reinforced rubber layer 52 which forms a part of inner wall member 14. This sleeve is made of an elastomeric material which has good heat resistance such as natural rubber or elastomeric blends using natural rubber. This layer 30 should be relatively flexible, yet have satisfactory abrasion resistance in order to adequately protect cord-reinforced rubber layer 52.

As seen in FIGS. 2 and 4, each valve member such as 18 must pass through each of several component layers of outer wall member 12 of annulus 10. It is therefore preferred to provide a cord-reinforced rubber patch such as 40 around the opening through wall member 12 through which each valve member 18 passes. It may be also desired to provide additional patches radially inwardly of patch 40 around one or more of the openings through each of the radially inwardly disposed component layers of wall member 12.

Each of the cord-reinforced rubber layer or ply components of annulus 10 may be similar to such rubber-cord composites as are frequently used in pneumatic tires or may, if desired, be different rubber-cord composites found to be otherwise suitable for purposes of this invention. The rubber components of all of the cord-rubber composites may be the same material or may differ from one another. Similarly all the cords in all of the cord-rubber composites may be of the same material or different, if desired. The cords may, for example, be made of any of the commonly used cord material found in pneumatic tires such as cotton, nylon, rayon, steel, polyester, and glass, although nylon would be the less preferable of these materials because of its tendency to elongate and shrink due to temperature fluctuations.

The fluid impermeable bladder member 20 may be made of a material commonly used for bladders in various tire molds. Elastomeric materials found suitable for bladder 20 are, for example, various butyl and chlorobutyl rubbers or blends thereof.

To describe the function and operation of annulus 10 for use in cold retreading, attention is primarily directed to FIG. 3, where annulus 10 is shown engaged with a carcass and tread assembly shown in outline. The assembly is internally pressurized as represented by arrows A. This pressurization may be achieved in any suitable manner such as for example by inflating the assembly with air while mounted on a rim or by some suitable pressure member such as a pressurized tube.

The carcass C of the assembly has a buffed and otherwise suitable prepared surface S over which is laid an unvulcanized binding layer B adapted to vulcanize at a relatively low selected temperature. A precured tread stock T is shown appropriately positioned on carcass C as shown. The heat and pressure annulus 10 of the present invention is positioned around the outer periphery of this assembly so that the axial ends 13 thereof extend downwardly over the shoulders and terminate slightly radially below the location of binding layer B. Steam or other suitable heating fluid is introduced through one of the valve members 18 and circulates through annular chamber 16. The pressure within the frusto-conically contoured margins 19 of annulus 10 pulls the axial ends 13 with rigid bead member 15 axially inwardly to effect a sealing of the enclosed peripheral portion of the assembly from any entrance of air from the outside.

It should be understood that the pressures and temperatures involved in any cold retreading operation may vary depending upon several factors such as the size of the tire being retreaded, the thickness of and material used for the precured tread and the specific composition of binding layers. Also, the shape and dimensions of a heat and pressure annulus, such as 10, are dependent upon similar factors. For example, the axial length of the cylindrical portion 19 should be at least approximately equal to the width of the precured tread section. The length of frusto-conical margins 19 of annulus 10 depend upon the combined thickness of the tread section T and binding layer B.

It has been found, in several applications, that a specifically contoured and dimensioned annulus is suitable for different sizes of tires because the above mentioned factors are very similar throughout these sizes. For example, an annulus having a cylindrical central portion 19 of around 6 to 7 inches in length, an overall length between about 9 to about 10 inches, a radial height of 1.3 to 1.5 inches and annular margins, such as 19, extending angularly inwardly at about a 23° angle relative to the cylindrical central portion is suitable for retreading 10.00–20 and 11–22.5 size truck tires using a cold retreading operation.

The carcasses or casing of both sizes mentioned previously were suitably buffed and otherwise prepared and a precured tread T and binding layer, such as B, capable of curing at a temperature between about 140°F. and about 240°F. were placed thereon. An annulus 10 having dimensions as mentioned above was secured to the periphery of each assembly. Each tire assembly was inflated or internally pressurized to about 90 psi and steam at 31 psi and 275°F. was introduced into chamber 16 of annulus 10. After about 150 minutes for each tire, the annulus was removed and the tires were run to failure on indoor pulley wheels under known endurance testing conditions to demonstrate adhesion between tread and casing. Tire failures were analyzed and the cause of failure in all cases were determined to be for reasons other than tread separation.

The foregoing specification describes a heat and pressure annulus with regard to its use in retreading used pneumatic carcasses. Recently, however, use has been made of the principles of cold retreading operations to apply new treads to new carcasses or casings. It should be understood, therefore, that the annulus described in accordance with this invention could also find utility in such applications.

Various modifications to and departures from the foregoing description may be made within the scope of the present invention which is to be measured by the following claims.

I claim:
1. A molded elastomeric heat and pressure annulus for securing a prevulcanized tread section to a pneumatic tire casing, said annulus comprising
   A. a fluid impermeable, tubular, elastomeric bladder member having an annular fluid chamber defined by radially outer and inner, substantially mutually parallel elastomeric walls, each of said walls having a contour comprising
      1. a substantially cylindrical central portion, and
      2. an axially spaced pair of substantially frustoconical, marginal portions extending inwardly from said central portion;
   B. at least one layer of cord reinforced elastomeric material disposed radially outwardly of, adjacent to and coextensive with, said radially outer wall of said bladder member, wherein said at least one layer comprises a plurality of spaced, substantially mutually parallel cords extending at an angle relative to the longitudinal axis of said annulus;
   C. at least one layer of cord reinforced elastomeric material disposed radially inwardly of, adjacent to and coextensive with, said radially inner wall of said bladder member wherein said at least one layer comprises a plurality of spaced substantially mutually parallel cords extending substantially parallel to the longitudinal axis of said annulus; and
   D. a circular, rigid, inextensible, bead-like member at each axial end of said annulus.
2. The annulus recited in claim 1 comprising an even number of layers as defined in B) and wherein the angle at which the cords in one of said even number of layers extends relative to the longitudinal axis of said annulus is equal but opposite to the angle at which the cords extend in the another of said even number of layers adjacent thereto.

* * * * *

UNITED STATES PATENT OFFICE
CERTIFICATE OF CORRECTION

Patent No. 3,839,123    Dated October 1, 1974

Inventor(s) Robert E. Sausaman

It is certified that error appears in the above-identified patent and that said Letters Patent are hereby corrected as shown below:

Column 1, line 34, delete "power".

Column 2, line 13, after "chambers." delete "a control voltage"; line 33, delete "signal."; line 38, after "annulus." delete "In R. B."; line 49, delete "capacitor" and insert ---invention---; line 53, after "views." delete "adder"; and line 54, delete "emitter" and insert ---1---.

Column 3, line 4, after "hereinafter." delete "(a.f.c.)"; line 5, delete "ideally" and insert ---further---; line 12, delete "the" and insert ---portions---; and line 50, after "tions." delete "the".

Column 4, line 4, after "plane P." delete "for".

Signed and sealed this 24th day of December 1974.

(SEAL)
Attest:

McCOY M. GIBSON JR.        C. MARSHALL DANN
Attesting Officer          Commissioner of Patents